(12) United States Patent
Yamamura et al.

(10) Patent No.: US 10,799,837 B2
(45) Date of Patent: Oct. 13, 2020

(54) SEPARATION MEMBRANE

(71) Applicant: TORAY INDUSTRIES, INC., Tokyo (JP)

(72) Inventors: Gohei Yamamura, Shiga (JP); Koichi Takada, Shiga (JP); Hiroki Tomioka, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 241 days.

(21) Appl. No.: 16/073,531

(22) PCT Filed: Jan. 27, 2017

(86) PCT No.: PCT/JP2017/003060
§ 371 (c)(1),
(2) Date: Jul. 27, 2018

(87) PCT Pub. No.: WO2017/131209
PCT Pub. Date: Aug. 3, 2017

(65) Prior Publication Data
US 2019/0046931 A1 Feb. 14, 2019

(30) Foreign Application Priority Data

Jan. 29, 2016 (JP) .................. 2016-016423

(51) Int. Cl.
*B01D 69/08* (2006.01)
*B01D 69/02* (2006.01)
(Continued)

(52) U.S. Cl.
CPC ........... *B01D 69/08* (2013.01); *B01D 67/003* (2013.01); *B01D 67/0013* (2013.01);
(Continued)

(58) Field of Classification Search
CPC ...... B01D 69/12; B01D 71/64; B01D 69/088; B01D 69/08; B01D 67/0016; B01D 67/0027; B01D 71/56; B01D 71/10
See application file for complete search history.

(56) References Cited

U.S. PATENT DOCUMENTS 5,806,059 A * 9/1998 Tsuchida ............... G06F 16/252
7,459,085 B2 12/2008 Koguma et al.
(Continued)

FOREIGN PATENT DOCUMENTS

EP 0302949 A1 2/1989
EP 1153969 A1 11/2001
(Continued)

OTHER PUBLICATIONS

International Search Report, issued in PCT/JP2017/003060, PCT/ISA/210, dated Mar. 21, 2017.
(Continued)

*Primary Examiner* — Ana M Fortuna
(74) *Attorney, Agent, or Firm* — Birch, Stewart, Kolash & Birch, LLP (57) ABSTRACT

The problem addressed by the present invention is to provide a separation membrane with superior permeation performance and separation performance and having few occurrences of defects. The present invention relates to a separation membrane wherein: the separation membrane has a layer (I) with a thickness of 0.5-100 μm; letting, in a cross-section in the direction of thickness of the layer (I), region a be a region with a depth of 50-150 nm from a surface (surface A), region b a region with a depth of 50-150 nm from the other surface (surface B), and region c a region with a thickness of 100 nm where the depth from both surfaces is the same, the average pore diameter Pa for region a and the average pore diameter Pb for region b are both 0.3-3.0 nm and the average pore diameter Pc for region c is
(Continued)

3.0 nm or less; and the percentage of open area Ha for region a, the percentage of open area Hb for region b, and the percentage of open area Hc for region c satisfy the following equations. 2Hc<Ha 2Hc<Hb

7 Claims, 1 Drawing Sheet

(51) Int. Cl.

| | | |
|---|---|---|
| *B01D 67/00* | (2006.01) | |
| *B01D 69/10* | (2006.01) | |
| *B01D 69/12* | (2006.01) | |
| *B01D 71/12* | (2006.01) | |
| *B01D 71/48* | (2006.01) | |
| *B01D 71/56* | (2006.01) | |
| *B01D 61/02* | (2006.01) | |

(52) U.S. Cl.
CPC ........... *B01D 69/02* (2013.01); *B01D 69/085* (2013.01); *B01D 69/087* (2013.01); *B01D 61/025* (2013.01); *B01D 69/10* (2013.01); *B01D 69/12* (2013.01); *B01D 71/12* (2013.01); *B01D 71/48* (2013.01); *B01D 71/56* (2013.01); *B01D 2323/20* (2013.01); *B01D 2325/02* (2013.01); *B01D 2325/022* (2013.01); *B01D 2325/023* (2013.01); *B01D 2325/24* (2013.01)

(56) References Cited

U.S. PATENT DOCUMENTS

| | | | | |
|---|---|---|---|---|
| 7,743,929 B2* | 6/2010 | Kools | ................ | B01D 67/0009 |
| | | | | 210/490 |
| 8,602,223 B2* | 12/2013 | Qiu | ................... | B01D 67/0088 |
| | | | | 210/500.38 |
| 9,005,496 B2* | 4/2015 | Liang | ................ | B01D 67/0013 |
| | | | | 210/490 |
| 10,040,033 B2* | 8/2018 | Hanakawa | ................ | C02F 1/44 |
| 10,478,782 B2* | 11/2019 | Yamamura | ............. | B01D 69/02 |
| 10,639,595 B2* | 5/2020 | Takada | ................... | B01D 71/16 |
| 2006/0121267 A1 | 6/2006 | Tsuyumoto et al. | | |
| 2007/0029256 A1* | 2/2007 | Nakano | ............... | A61M 1/3633 |
| | | | | 210/641 |
| 2008/0004205 A1* | 1/2008 | Tkacik | .................. | B01D 71/34 |
| | | | | 210/500.21 |
| 2009/0110900 A1 | 4/2009 | Yokota et al. | | |
| 2011/0165308 A1 | 7/2011 | Shiki | | |
| 2013/0140236 A1 | 6/2013 | Tokimi et al. | | |
| 2013/0292866 A1 | 11/2013 | Shiki | | |
| 2014/0039415 A1 | 2/2014 | Schneider et al. | | |
| 2014/0091037 A1 | 4/2014 | Shiki | | |
| 2016/0052804 A1 | 2/2016 | Nosaka et al. | | |
| 2016/0303522 A1* | 10/2016 | Wang | .................. | B01D 61/027 |
| 2017/0157572 A1 | 6/2017 | Iwai et al. | | |

FOREIGN PATENT DOCUMENTS

| | | | |
|---|---|---|---|
| EP | 1413350 | A1 | 4/2004 |
| EP | 3202486 | A1 | 8/2017 |
| EP | 3278867 | A1 | 2/2018 |
| JP | 2001-843 | A | 1/2001 |
| JP | 2007-289886 | A | 11/2007 |
| JP | 2008-272636 | A | 11/2008 |
| JP | 2012-115835 | A | 6/2012 |
| JP | 2014-73487 | A | 4/2014 |
| WO | WO 2004/043666 | A1 | 5/2004 |
| WO | WO 2010/035754 | A1 | 4/2010 |
| WO | WO 2014/156644 | A1 | 10/2014 |
| WO | WO 2015/041286 | A1 | 3/2015 |
| WO | WO 2016/006611 | A1 | 1/2016 |

OTHER PUBLICATIONS

Written Opinion of the International Searching Authority, issued in PCT/JP2017/003060, PCT/ISA/237, dated Mar. 21, 2017.
Extended European Search Report for European Application No. 17744439.5, dated Aug. 26, 2019.
European Office Action, dated May 26, 2020, for European Application No. 17744439.5.

* cited by examiner

SEPARATION MEMBRANE

TECHNICAL FIELD

The present invention relates to a separation membrane being excellent in permeation performance and separation performance, and having fewer occurrences of defects.

BACKGROUND ART

The separation membrane is used in a wide range of fields, such as water treatment membranes for removing turbidity matters or ions from river waters, seawater or wastewater to produce industrial water, drinking water, or the like; medical membranes for artificial kidneys, plasma separation, or the like; membranes for food-beverage industry such as fruit juice concentration; and gas separation membranes for separating carbonic acid gas or the like. In particular, since a water treatment membrane called reverse osmosis membrane can remove ions, it is considered promising as means of producing pure water from seawater or brackish water.

As a method for producing such a reverse osmosis membrane, conventionally used techniques may include an interfacial polymerization method and a non-solvent phase separation method.

As for the interfacial polymerization method, for example, Patent Document 1 discloses a technique for obtaining a hollow fiber type composite semipermeable membrane by contacting a porous support with an amine aqueous solution, and then with a solution of trimesic acid chloride in hexane, so as to coat a surface of the porous support with a polyamide polymer thin membrane.

As for the non-phase separation method, for example, Patent Document 2 discloses a technique for obtaining a hollow fiber type semipermeable membrane by mixing N-methyl-2-pyrrolidone, ethylene glycol and benzoic acid with cellulose triacetate, and immersing the resulting solution in a solidification bath containing N-methyl-2-pyrrolidone/ethylene glycol/water while discharging it from a nozzle.

BACKGROUND ART DOCUMENTS

Patent Documents

Patent Document 1: JP-A-2001-843
Patent Document 2: JP-A-2012-115835

SUMMARY OF THE INVENTION

Problems that the Invention is to Solve

In the separation membranes obtained by the techniques disclosed in the aforementioned Patent Documents 1 and 2, certain permeation performance and separation performance can be obtained, but prevention of occurrence of defects has not been sufficient.

An object of the present invention is to provide a separation membrane being excellent in permeation performance and separation performance, with fewer occurrences of defects.

Means for Solving the Problems

The present invention is as follows.

1. A separation membrane, comprising: a layer (I) having a thickness of 0.5 μm to 100 μm, in which, when, in a cross section of the layer (I) in a thickness direction, a region at a depth of 50 nm to 150 nm from a surface (surface A) is defined as a region a, a region at a depth of 50 nm to 150 nm from the other surface (surface B) is defined as a region b, and a region having a thickness of 100 nm which is at the same depth from both of the surfaces is defined as a region c, both of an average pore diameter Pa of the region a and an average pore diameter Pb of the region b are 0.3 nm to 3.0 nm, and an average pore diameter Pc of the region c is 3.0 nm or less, and an open pore ratio Ha of the region a, an open pore ratio Hb of the region b, and an open pore ratio Hc of the region c satisfy the following formulas:

$$2Hc < Ha; \text{ and}$$

$$2Hc < Hb.$$

2. The separation membrane according to 1, wherein both the open pore ratio Ha and the open pore ratio Hb are 2% to 80%, and the open pore ratio Hc is 40% or less.

3. The separation membrane according to 1 or 2, in which the layer (I) contains at least one selected from the group consisting of polyamide, polyester, and cellulose ester.

4. The separation membrane according to any one of 1 to 3, including a structure in which a layer (II) including a porous support membrane having a thickness of 5 μm to 500 μm is further laminated.

5. The separation membrane according to any one of 1 to 4, in which the separation membrane has a form of a hollow fiber.

6. The separation membrane according to any one of 1 to 5, in which a tensile strength in a longitudinal direction thereof is 70 MPa or more.

7. The separation membrane according to any one of 1 to 6, in which when an aqueous solution of sodium chloride, adjusted to a concentration of 500 ppm and a pH of 6.5, is filtrated at 25° C. and a pressure of 0.75 MPa, a water permeation amount is 2 L/m²/day or more.

Advantage of the Invention

According to the present invention, there is provided a separation membrane being excellent in permeation performance and separation performance, with fewer occurrences of defects. The separation membrane of the present invention can be preferably used for applications requiring permeation performance, separation performance, and prevention of the occurrence of defects.

Specifically, the separation membrane can be used for water treatment membranes for producing industrial water, drinking water or the like from seawater, brackish water, sewage water, waste water or the like, medical membranes for artificial kidneys, plasma separation or the like, membranes for food-beverage industry such as fruit juice concentration, gas separation membranes for separating exhaust gas, carbonic acid gas, or the like, membranes for electronic industry such as fuel cell separators, or the like. The above-mentioned water treatment membrane can be preferably used for microfiltration membranes, ultrafiltration membranes, nanofiltration membranes, reverse osmosis membranes, forward osmosis membranes, or the like.

BRIEF DESCRIPTION OF STRETCHINGS

MODE FOR CARRYING OUT THE INVENTION

I. Separation Membrane
(1) Layer (I)

The separation membrane of the present invention includes a layer (I) having a thickness of 0.5 μm to 100 μm. The layer (I) is a layer denoted by reference numeral "1" in FIG. 1.

Figure 1:
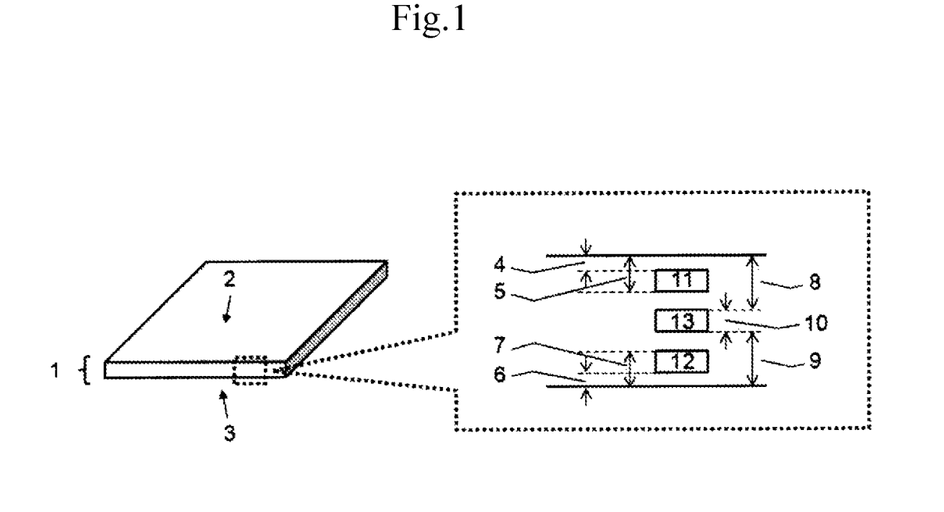
FIG. 1 is a cross-sectional view of a separation membrane according of the present invention.

The layer (I) includes regions a, b and c in a cross section in a thickness direction.

(1-1) Regions a, b, and c

As shown in FIG. 1, the region a refers to a region at the depth of 50 nm to 150 nm from a surface (surface A) 2 of the layer (I). The region b refers to a region at the depth of 50 nm to 150 nm from the other surface (surface B) 3 of the layer (I). The region c refers to a region having a thickness of 100 nm at a depth where the depth from the surface A 2 and the depth the surface B 3 are the same. In other words, the region c refers to a region having a width of 100 nm whose center is a bisector of the thickness of the layer (I) in the cross section of the layer (I).

Both an average pore diameter Pa of the region a and an average pore diameter Pb of the region b are 0.3 nm to 3.0 nm, and an average pore diameter Pc of the region c is 3.0 nm or less.

An open pore ratio Ha of the region a 11, an open pore ratio Hb of the region b 12, and an open pore ratio Hc of the region c 13 satisfy the following formulas:

$2Hc<Ha$; and $2Hc<Hb$.

(1-2) Thickness of Each Portion

It is important that the layer (I) has a thickness of 0.5 μm to 100 μm. In a case where the thickness of the layer (I) is less than 0.5 μm, defects tend to occur in the membrane, and the separation performance is insufficient. In a case where the thickness of the layer (I) is greater than 100 μm, the permeation performance is insufficient.

The thickness of the layer (I) is preferably 0.5 μm to 50 μm, more preferably 0.5 μm to 30 μm, still more preferably 0.5 μm to 20 μm, and particularly preferably 0.5 μm to 10 μm.

The thicknesses of the regions a, b, and c are all 100 nm.

(1-3) Average Pore Diameter

It is important that, in the layer (I), both an average pore diameter Pa of the region a and an average pore diameter Pb of the region b are 0.3 nm to 3.0 nm. In a case where the Pa and Pb are less than 0.3 nm, the permeation performance is insufficient. In a case where the Pa and Pb are greater than 3.0 nm, the separation performance is insufficient.

The Pa and Pb are preferably 0.4 nm or more, more preferably 0.5 nm or more, still more preferably 0.6 nm or more, and particularly preferably 0.7 nm or more.

In addition, the Pa and Pb are preferably 2.5 nm or less, more preferably 2.0 nm or less, still more preferably 1.5 nm or less, and particularly preferably 1.3 nm or less.

The average pore diameter Pc of the region c in the layer (I) is 3.0 nm or less. In a case where the Pc is greater than 3.0 nm, the separation performance is insufficient.

The Pc is preferably 2.5 nm or less, more preferably 2.0 nm or less, still more preferably 1.5 μm or less, and particularly preferably 1.3 μm or less.

(1-4) Open Pore Ratio

In the layer (I), an open pore ratio Ha of the region a, an open pore ratio Hb of the region b, and an open pore ratio Hc of the region c satisfy the following formulas. A method for determining the open pore ratio is described in detail in Examples.

$2Hc<Ha$ $2Hc<Hb$.

In a case where the formulas are not satisfied, it becomes difficult to achieve both the permeation performance and the separation performance, and the occurrence of defects cannot be prevented.

The open pore ratios Ha, Hb, and Hc preferably satisfy, at least one of $3Hc<Ha$ or $3Hc<Hb$, more preferably satisfy, at least one of $5Hc<Ha$ or $5Hc<Hb$, and still more preferably satisfy, at least one of $10Hc<Ha$ or $10Hc<Hb$.

It is preferable that at least one of the open pore ratio Ha and the open pore ratio Hb is 2% to 80%. More preferably, both the open pore ratio Ha and the open pore ratio Hb are 2% to 80%. When the open pore ratio Ha and the open pore ratio Hb fall within the above-described ranges, both the permeation performance and the separation performance can be achieved within a range, in which both performances are good.

More preferably, the open pore ratio Ha and the open pore ratio Hb are each 5% or more, still more preferably 7% or more, and particularly preferably 10% or more. More preferably, the open pore ratio Ha and the open pore ratio Hb are each 65% or less, still more preferably 45% or less, and particularly preferably 30% or less.

It is preferable that the open pore ratio Hc is 40% or less. When the open pore ratio Hc falls within the above-described range, both the permeation performance and the separation performance can be achieved within a range, in which both performances are good. The open pore ratio Hc is more preferably 30% or less, still more preferably 20% or less, even more preferably 10% or less, and particularly preferably 5% or less.

(1-5) Constituent Material
(1-5-1) Main Component Resin

Examples of a main component resin constituting the layer (I) include, for example, polyolefin, polyacrylonitrile, polyvinyl compounds, polycarbonate, poly(meth)acrylate, polysulfone, polyethersulfone, polyamide, polyester, and cellulose ester.

Of these, polyamide, polyester and cellulose ester are preferably. Namely, it is preferable that the layer (I) contains at least one selected from the group consisting of polyamide, polyester, and cellulose ester.

Herein, the "main component" refers to a component whose content ratio is 50 wt % or more in a composition. This content is preferably 70 wt % or more, and more preferably 90 wt % or more. That is, the layer (I) contains 50 wt % or more of the main component resin.

Specific examples of the polyamide include: various polyamides obtained by ring-opening polymerization of various lactams, polycondensation of various diamines and various dicarboxylic acids, and polycondensation of various aminocarboxylic acids; or copolymerized polyamides obtained by combining the above ring-opening polymerization and polycondensation.

Examples of the above polyamides or copolymerized polyamides include, for example, nylon 6, nylon 66, nylon 11, nylon 12, a nylon 6/12 copolymer (a copolymer of ε-caprolactam and laurolactam), and a nylon 6/66 copolymer (a copolymer of ε-caprolactam and a nylon salt of hexamethylenediamine and adipic acid). In addition, two or more of these polyamides can be mixed and used.

Specific examples of the polyester include, for example, aromatic polyester composed of an aromatic dicarboxylic acid moiety and a glycol moiety, aliphatic polyester composed of aliphatic dicarboxylic acid and a glycol moiety, polyester composed of hydroxy carboxylic acid, and a copolymer thereof.

Specific examples of the aromatic dicarboxylic acid include, for example, terephthalic acid, isophthalic acid, and naphthalenedicarboxylic acid. Specific examples of the glycol include ethylene glycol, 1,2-propylene glycol, 1,3-propylene glycol, 1,2-butanediol, 1,3-butanediol, and 1,4-butanediol.

Specific examples of the hydroxy carboxylic acid include glycolic acid, lactic acid, hydroxypropionic acid, hydroxybutyric acid, hydroxyvaleric acid, hydroxycaproic acid, and hydroxybenzoic acid.

In addition, the polyester can be copolymerized to the extent that properties thereof are not significantly changed. Examples of a copolymerization component include 5-(alkali metal) sulfoisophthalic acid such as 5-sodium sulfoisophthalic acid, and polyvalent carboxylic acid other than the above-described aromatic dicarboxylic acid. In addition, two or more of these polyesters can be mixed and used.

Specific examples of the cellulose ester include, for example, cellulose acetate, cellulose propionate, cellulose butyrate, cellulose-mixed ester in which three hydroxyl groups present in a glucose unit of cellulose are blocked with two or more kinds of acyl groups, and a derivative thereof.

Specific examples of the cellulose-mixed ester include, for example, cellulose acetate propionate, cellulose acetate butyrate, cellulose acetate laurate, cellulose acetate oleate, and cellulose acetate stearate. In addition, two or more of these cellulose esters can be mixed and used.

(1-5-2) Plasticizer

The separation membrane of the present invention may contain a plasticizer.

The plasticizer is not particularly limited, as long as it is a compound which thermoplasticizes the main component resin. In addition, not only one plasticizer but also two or more plasticizers may be used in combination.

Specific examples of the plasticizer include, for example, phthalate ester compounds such as diethyl phthalate, aliphatic dibasic acid ester compounds such as di-1-butyl adipate, phosphate esters such as diphenyl 2-ethylhexyl phosphate, hydroxy polycarboxylic acid esters such as acetyl tributylcitrate, Fatty acid esters such as methyl acetyl ricinoleate, polyhydric alcohol esters such as glycerin triacetate, polyalkylene glycols such as polyethylene glycol, caprolactone compounds, and a derivative thereof.

Of these, the polyalkylene glycols are preferable. The polyalkylene glycols exert a plasticizing effect with addition in a small amount and can prevent reduction in the membrane strength. In addition, fine pores after elution become finer, and thereby both the separation performance and the permeation performance can be achieved.

Specific examples of the polyalkylene glycol plasticizer include, for example, polyethylene glycol, polypropylene glycol, and polybutylene glycol, each having a weight-average molecular weight of 400 to 2,000.

(1-5-3) Hydrophilic Resin

The separation membrane of the present invention may contain a hydrophilic resin. In a case where the hydrophilic resin is contained, the permeation performance can be improved particularly when using the membrane as a water treatment membrane.

The hydrophilic resin as used in the present invention refers to a resin having high affinity for water, which is dissolved in water or has a smaller contact angle with water than that of the main component of the separation membrane.

Specific examples of the hydrophilic resin are not particularly limited as long as it has the above described properties. For example, preferable examples include polyalkylene glycol, polyvinyl pyrrolidone, polyvinyl alcohol, and a derivative thereof.

Although it is preferable that the hydrophilic resin remains in the separation membrane, the hydrophilic resin may be partially or completely eluted from the separation membrane into water. In a case where the hydrophilic resin is eluted into water, traces left after escape of the hydrophilic resin become fine pores in the membrane, as a result, the permeation performance is improved.

(1-5-4) Additive

The separation membrane of the present invention may contain an additive other than the substances described above, to the extent not impairing the effect of the present invention.

Specific examples of the additive include an organic lubricant, a crystal nucleating agent, organic particles, inorganic particles, a terminal blocking agent, a chain extender, an ultraviolet absorber, an infrared absorber, a coloration preventing agent, a delustering agent, an antimicrobial agent, an electrification controlling agent, a deodorant, a flame retardant, a weather-resistant agent, an antistatic agent, an antioxidant, an ion-exchanging agent, an antifoaming agent, a color pigment, a fluorescent whitening agent, a dye.

(2) Layer (II)

In addition to the layer (I), the separation membrane may further include a layer (II) which is a porous support membrane. In other words, the layer (I) may be laminated with the layer (II) which is a porous support layer. By providing the layer (II), the separation membrane is physically reinforced, so that the layer (I) can be made thinner while maintaining the strength of the separation membrane. As a result, the water permeability of the separation membrane is improved.

(2-1) Thickness

It is preferable that the layer (II) has a thickness of 5 μm to 500 μm. When the thickness of the layer (II) falls within the above-described range, both the sufficient support performance and the separation performance can be achieved well.

The thickness of the layer (II) is more preferably 10 μm to 400 μm, still more preferably 20 μm to 300 μm, and particularly preferably 30 μm to 200 μm.

(2-2) Pore Diameter and Open Pore Ratio

When the porous support membrane of the layer (II) is used as a separation membrane, the pore diameter and the open pore ratio are not particularly limited as long as the layer (I) is physically supported and the permeation performance in terms of thickness is not lower than the permeation performance in a case where layer (I) is used alone.

(2-3) Constituent Material

The type of the material constituting the layer (I) is not particularly limited. However, from a viewpoint of achieving the membrane-forming performance and the interlayer adhesion, it is preferable to contain the material constituting the layer (I).

(3) Layer Constitution of Separation Membrane

The separation membrane may be constituted of only the layer (I), or of two layers of the layer (I) and the layer (II), and as long as at least the layer (I) is included, the separation membrane may also be constituted of two or more layers including other layers.

In a case where the separation membrane is constituted of two layers of the layer (I) and the layer (II), any layer may be in contact with the material before separation. It is preferable that the layer (I) is in contact with the material before separation.

In a case where the separation membrane is constituted of three or more layers, the lamination order is not particularly limited. It is preferable that the layer (I) is in contact with the material before separation.

(4) Form of Separation Membrane

Although the form of the separation membrane is not particularly limited, a membrane having a hollow fiber form (hereinafter also referred to as a hollow fiber membrane) or a membrane having a planner form (hereinafter also referred to as a flat membrane) is preferably adopted. Of these, the hollow fiber membrane is more preferred, because it is possible to be efficiently filled in a module, thereby being able to enlarge an effective membrane area per unit volume of the module.

In a case of the hollow fiber membrane, from a viewpoint of achieving both the effective membrane area and the membrane strength at the time of being filled in the module, an outer diameter of the hollow fiber is preferably 20 μm to 200 μm, more preferably 30 μm to 180 μm, and still more preferably 40 μm to 160 μm.

In addition, in a case where the separation membrane of the present invention is in a hollow fiber form, a percentage of hollowness of the hollow fiber is preferably 20% to 55%, more preferably 25% to 50%, and still more preferably 30% to 45%, in view of a relationship between a pressure loss of a fluid flowing through the hollow part and the buckling pressure.

A method for adjusting the outer diameter or the percentage of hollowness of the hollow fiber membrane to fall within the above-mentioned ranges is not particularly limited. For example, the adjustment can be made by appropriately changing a shape of a discharge hole of a spinning spinneret for producing the hollow fiber or a draft ratio which can be calculated by a winding rate/discharge rate.

(5) Tensile Strength

The separation membrane of the present invention preferably has a tensile strength of 70 MPa or more in a longitudinal direction, in order to suppress occurrence of defects due to external force at the time of membrane formation, module preparation, etc. Measurement conditions of the tensile strength are described in detail in Examples.

The tensile strength in the longitudinal direction is more preferably 80 MPa or more, still more preferably 100 MPa or more, and particularly preferably 120 MPa or more. The higher tensile strength in the longitudinal direction is preferred, but a practical upper limit thereof is 300 MPa.

A method for adjusting the tensile strength to fall within the above-mentioned ranges is not particularly limited. However, it includes setting a draft ratio which can be calculated by the winding rate/discharge rate when producing the separation membrane, and/or a stretch ratio within a preferred range, which will be described later.

(6) Membrane Permeation Flux (Water Permeation Amount)

In order to exhibit good permeation performance particularly when the separation membrane of the present invention is used as a water treatment membrane, it is preferable that when an aqueous solution of sodium chloride, adjusted to a concentration of 500 ppm and a pH of 6.5, is filtrated at 25° C. and a pressure of 0.75 MPa, a membrane permeation flux (a water permeation amount) is 2 $L/m^2/day$ or more. Measurement conditions of the membrane permeation flux are described in detail in Examples.

The membrane permeation flux is more preferably 5 $L/m^2/day$ or more, still more preferably 10 $L/m^2/day$ or more, even more preferably 20 $L/m^2/day$ or more, and particularly preferably 30 $L/m^2/day$ or more. The higher membrane permeation flux is preferred, but the upper limit is 500 $L/m^2/day$ in view of a balance with a salt rejection ratio which will be described later.

(7) Salt Rejection Ratio

In order to exhibit good separation performance particularly when the separation membrane of the present invention is used as a water treatment membrane, it is preferable that a salt rejection ratio is 90% or more. Measurement conditions of the salt rejection ratio are described in detail in Examples.

The salt rejection ratio is more preferably 92.5% or more, still more preferably 95% or more, even more preferably 96.5% or more, and particularly preferably 98% or more. In addition, the salt rejection ratio is preferably 99.9% or less, and more preferably 99.5% or less.

(8) Type of Membrane

The separation membrane of the present invention is a membrane particularly usable for water treatment. Specifically, examples of the water treatment membrane include microfiltration membranes, ultrafiltration membranes, nanofiltration membranes, reverse osmosis membranes, and forward osmosis membranes. The separation membrane of the present invention is preferably applied particularly to the nanofiltration membranes, the reverse osmosis membranes, and the forward osmosis membranes.

II. Production Method

Next, a method for producing the separation membrane of the present invention is specifically described below, taking as an example a case where the separation membrane is a hollow fiber membrane, but should not be construed as being limited thereto.

The production method described hereinafter is a method for producing the hollow fiber membrane by melt spinning. Generally, the method includes the following steps:

(a) a step of melt-kneading the main component resin, at least one of the plasticizer and the hydrophilic resin described above to prepare a resin composition;

(b) a step of discharging the melt-kneaded resin composition thus obtained from a spinneret, and cooling the same in the air to form a hollow fiber; and (c) a step of eluting at least a part of the plasticizer and the hydrophilic resin from the obtained hollow fiber.

(a) Melt-Kneading Step

In this step, the main component resin, and at least one of the plasticizer and the hydrophilic resin are melt-kneaded. Specifically, in this step, the above-described materials are melt-kneaded to prepare the resin composition (pellets).

The resin composition (pellets) described below can be applicable to both the layer (I) and the layer (II). The main component resin and other materials are fed into a twin screw kneading extruder, and heated and melted. At this time, in addition to the main component resin, at least one of the plasticizer and the hydrophilic resin should be contained in the pellets. Preferred resins for the main component resin, the plasticizer and the hydrophilic resin are those as described above.

A content of the plasticizer is preferably 5 wt % to 26 wt % based on 100 wt % of the resin composition constituting the pellets. When the content of the plasticizer is 5 wt % or more, the thermoplasticity of the cellulose ester and the permeation performance of the separation membrane become good. When the content of the plasticizer is 26 wt % or less, the separation performance and the membrane strength of the separation membrane become good. The content of the plasticizer is more preferably 10 wt % to 24 wt %, and still more preferably 14 wt % to 22 wt %.

Content of the hydrophilic resin is preferably 0.01 wt % to 10 wt % based on 100 wt % of the resin composition constituting the pellets. When the content of the hydrophilic resin is 0.01 wt % or more, the permeation performance of the separation membrane becomes good. When the content of the hydrophilic resin is 10 wt % or less, the separation performance and the membrane strength of the separation membrane become good. The content of the hydrophilic resin is more preferably 0.05 wt % to 8.0 wt %, and still more preferably 0.1 wt % to 6.0 wt %.

The feeding method is not particularly limited. Examples of the feeding method include a method of feeding with mixing in advance and a method of feeding by using a plurality of feeders set with respective discharge amounts. Melt-kneading is conducted until the materials are homogeneous mixed, thereafter, the materials are discharged into a water bath in a gut shape and cut with a pelletizer to obtain the pellets.

(b) Formation of Hollow Fiber

Next, the obtained pellets are formed into a hollow fiber by the melt spinning method. Specifically, the step of forming the hollow fiber includes: extruding the heated and melted resin composition into a shape of a hollow fiber from the discharge hole of the spinneret; and solidifying the extruded resin composition by cooling in the air.

Figure 2:
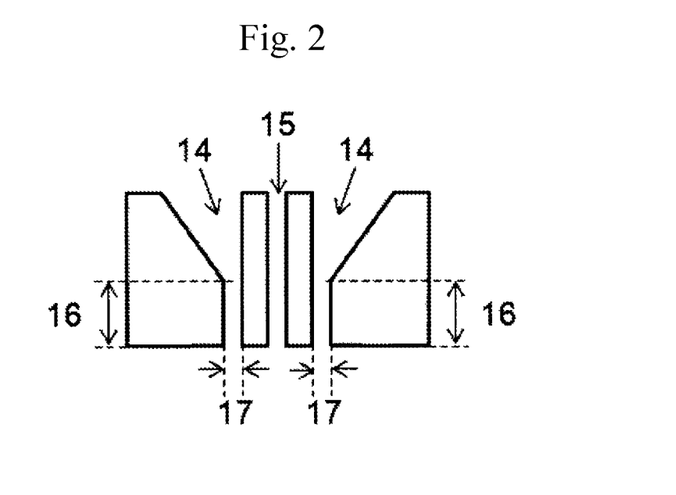
FIG. 2 is a cross-sectional view of an example of a discharge portion of a spinneret in a method for producing a hollow fiber membrane of the present invention.

Here, in the present invention, as shown in FIG. 2, it is preferable that a ratio (L/D) of a hole length (L) 16 of the discharge hole of the spinning spinneret to a hole opening (D) 17 falls into a range of 2 to 20. Here, the hole length (L) 16 refers to the length of a portion having the same distance as the hole opening of a discharging portion of the spinneret, also called a land length. In addition, the hole opening (D) 17 refers to a thickness of a slit of the discharging portion of the spinneret.

The L/D is more preferably 4 or more, still more preferably 8 or more, and particularly preferably 11 or more. In addition, the L/D is more preferably 18 or less, and still more preferably 16 or less. The L/D may be 12 or less.

It is preferable that the hole length (L) is 0.2 mm or more, 0.5 mm or more, 1 mm or more, or 2 mm or more. In addition, it is preferable that the hole length (L) is 10 mm or less, 8 mm or less, 6 mm or less, or 5 mm or less.

Regarding the cooling, as long as the resin composition can be cooled to a temperature at which it is solidified in the air, other conditions are not particularly limited.

A cooling device that applies air to the hollow fiber may be used for cooling. It is preferable that the winding rate (a spinning rate) of the hollow fiber is set to be greater than the discharge rate thereof. It is preferable that the draft ratio is 200 or more, 300 or more, or 400 or more. In addition, it is preferable that the draft ratio is 1000 or less, 900 or less, or 800 or less.

In the present invention, when the hole length (L) of the spinneret, the ratio (L/D) of the hole length to the hole opening, and the draft ratio are set to fall within the above-described ranges, average pore diameters and the porosities of the regions a, b, and c can be set within the above-described preferred ranges.

Thought the reason is not clearly understood, it may be considered that because in the discharge hole, due to a shear given to each region in the thickness direction of the resin composition of layer (I), a flow speed difference occurring in the thickness direction, and a shearing given to each region in the thickness direction of the resin composition of layer (I) by draft after discharging, the status of dispersion of the plasticizer and the hydrophilic resin in the thickness direction of the layer (I) is changed.

In the present invention, various spinnerets for producing a hollow fiber can be used. Specifically, for example, a spinning spinneret of a C-shaped slit, a spinning spinneret having one discharge hole formed by arranging a plurality of (e.g., 2 to 5) arcuate (arc-shaped) slit parts, a tube-in orifice type spinning spinneret, and or the like can be used for producing the hollow fiber.

A distance between the discharge of the resin composition and the start of cooling, specifically a distance from the lower surface of the spinning spinneret to the upper end of the cooling apparatus (chimney) is preferably 0 to 50 mm, more preferably 0 to 40 mm, and still more preferably 0 to 30 mm.

The producing method may further include a step of stretching the hollow fiber after spinning. A stretching method is not particularly limited. For example, the hollow fiber membrane before stretching is transferred on a heated roll, or heated in an oven, thereby raising the temperature to a temperature at which stretching is performed, and stretched utilizing a peripheral speed difference between rolls. The stretching is performed in a single stage or in multiple stages of two or more stages.

For example, in a case where the main component resin is a cellulose ester, the preferred temperature range of the hollow fiber membrane in the stretching step is 60° C. to 140° C., more preferably 70° C. to 130° C., and still more preferably 80° C. to 120° C.

A total stretch ratio is preferably 1.1 to 2.0 times, more preferably 1.2 to 2.0 times, and still more preferably 1.3 to 1.5 times. In addition, heat setting may be performed during or after stretching as needed. A heat setting temperature is preferably 100° C. to 220° C.

A method for preparing a hollow fiber by laminating the layer (I) and the layer (II) is specifically described in detail in Examples.

(c) Eluting Step

The plasticizer and/or the hydrophilic resin may be eluted from the hollow fiber obtained by spinning and winding. An eluting method is not particularly limited. Immersion in a solvent such as water, an aqueous alcohol solution, an acid aqueous solution, an alkaline aqueous solution or the like can be adopted. A method for preparing a flat separation membrane is specifically described in detail in Examples.

Traces formed by elution of the plasticizer or the hydrophilic resin become fine pores in the membrane. The plasticizer and the hydrophilic resin may remain in the separation membrane, or may be completely eluted from the separation membrane.

As means for making the average pore diameters Pa, Pb, Pc and the open pore ratio fall within the above-described ranges, as described above, a preferred method comprises melting and forming the resin composition containing the main component resin and at least one of the plasticizer and the hydrophilic resin at a draft ratio within a specific range using a spinneret having the hole length within a specific range and a relationship between the hole opening and the hole length within a specific range, thereafter eluting at least a part of the plasticizer and the hydrophilic resin into water to form fine pores. However, the present invention is not limited to this method.

III. Module

The separation membrane of the present invention obtained as described above can be made into a module by filling it into a case by a conventionally known method. For example, a hollow fiber membrane module includes a plurality of hollow fiber membranes and a cylindrical case. The plurality of hollow fiber membranes are bundled and inserted into the cylindrical case, and thereafter, end portions thereof are fixed and sealed to the case with a thermosetting resin, such as polyurethane or an epoxy resin. Opening faces of the hollow fiber membranes are obtained by cutting the end portions of the hollow fiber membranes cured with the thermosetting resin, to prepare a module.

So far as a flat membrane is concerned, it is fixed to a support, or the membranes are stuck to each other to form an envelope-shaped membrane, and further installed to a water collecting tube or the like as needed, thereby achieving modularization.

IV. Fresh Water Production Method

After being made in the form of the module, the separation membrane of the present invention can be used for producing fresh water for the purpose of removing the solute from the solution. An operation pressure at this time is preferably 0.1 MPa or more, more preferably 0.3 MPa or more, and still more 0.6 MPa or more. Generally, both of the membrane permeation flux and the salt rejection ratio increase as the operation pressure increases.

In addition, in order to prevent breakage of the membrane, such as collapse of the hollow fiber membrane in a radial direction, the operation pressure is preferably 6.0 MPa or less, more preferably less than 3.0 MPa, and still more preferably less than 1.5 MPa.

In a case where the separation membrane of the present invention is used for liquid desalination, in order to achieve a high salt rejection ratio, the temperature of the liquid to be supplied is preferably 45° C. or less, more preferably less than 40° C., and still more preferably less than 35° C. In addition, in order to obtain a high membrane permeation flux, the temperature of feed water is preferably 5° C. or more, and more preferably 10° C. or more.

Further, as to the pH of the feed liquid, there are concerns of occurrence of scales of magnesium or the like in a case of feed water with high salt concentration such as seawater, and deterioration of the membrane due to high pH operation, thus operation in a neutral range is preferred.

Upper limits and lower limits of the above-described ranges can be optionally combined.

EXAMPLES

The present invention is more specifically described below by referring to Examples. However, the present invention should not be construed as being limited thereto in any way.

[Measurement and Evaluation Methods]

Hereinafter, the present invention is described in detail referring to Examples. The respective characteristic values in Examples were determined by the following methods.

In (1), (2), and (8) below, the separation membrane was measured and evaluated in the state of being vacuum-dried at 25° C. for 8 hours.

(1) Thickness (μm) of Each Layer of Separation Membrane

A cross section of the separation membrane in a thickness direction was observed and photographed by a scanning electron microscope, and a thickness of a layer (I) or a layer (II) was calculated. The thickness of each layer was calculated by observing arbitrary 10 points, and an average value thereof was employed.

(2) Percentages of Hollowness (%) and Outer Diameter (μm) of Hollow Fiber Membrane Cross sections in a direction perpendicular to a longitudinal direction (a fiber radial direction) of the hollow fiber membrane and in the thickness direction of the membrane were observed and photographed by an optical microscope, and a total area Sa (μm$^2$) including hollow parts of the cross sections and an area Sb (μm$^2$) of a hollow part were measured. The percentage of hollowness and outer diameter were calculated using the following formula. The percentage of hollowness, and the outer diameter were calculated using 10 hollow fibers, and average values thereof were obtained.

Percentage of hollowness (%)=$(Sb/Sa) \times 100$

Outer diameter (μm)=$(4 \times Sa/\pi)^{1/2}$ (3) Average Pore Diameters Pa, Pb, Pc (Nm)

The separation membrane in a wet state was freeze-dried. Thereafter, observation samples of the cross section in the longitudinal direction of the separation membrane were prepared by a RuO$_4$ dyeing ultrathin sectioning method. A region a, a region b, and a region c were observed and photographed with a transmission electron microscope (H-7100 FA manufactured by Hitachi) at an acceleration voltage of 100 kV and a magnification of 100.000 times, respectively. The resulting cross-sectional photograph was enlarged and printed so that 20 nm therein corresponds to 5 cm in the enlarged photograph, and a transparent film or sheet was superimposed on the enlarged photograph and portions corresponding to fine pores were filled with an oil-based ink or the like. Here, the portions corresponding to the fine pores were regarded as black fine particles formed by deposition of RuO$_4$ gas. Subsequently, using an image analyzer, a pore diameter of the portions was determined. This measurement was performed with respect to arbitrary 30 fine pores of each region and number-averaged to determine an average pore diameter (nm).

(4) Open Pore Ratio Ha, Hb, Hc (%)

With respect to each of the region a, the region b and the region c, the number of fine pores per 20 nm square in the enlarged photograph, for which the average pore diameter was calculated in (3) above, was counted and converted to the number of fine pores per 1 m$^2$. This calculation was performed on 20 nm square of arbitrary five places of each region and number-averaged to calculate a fine pore density (pores/m$^2$) of each region. An open pore ratio was determined from the average pore diameter (nm) determined in (3) above and the fine pore density (pores/μm$^2$) according to the following formula.

Open pore ratio (%)=$(\pi \times ((\text{average pore diameter})/2)^2) \times (\text{fine pore density}) \times 10^{-16}$ (5) Permeation Performance (Membrane Permeation Flux (μm²/day))

The separation membrane was hydrophilized by immersion in a 10 wt % aqueous solution of isopropyl alcohol for 1 hour. An aqueous sodium chloride solution adjusted to a concentration of 500 ppm, a temperature of 25° C. and a pH of 6.5 was fed thereto at an operation pressure of 0.75 MPa, thereby performing a membrane filtration treatment. Based on the permeate amount obtained, the membrane permeation flux was determined according to the following formula:

Membrane permeation flux (L/m²/day)=permeate amount per day/membrane area (6) Separation Performance (Salt Rejection Ratio (%))

A membrane filtration treatment was performed under the same conditions as in the case of membrane permeation flux, and the salt concentration of the obtained permeate was measured. From the measured salt concentration of permeate and the salt concentration of feed water, the salt rejection ratio was determined based on the following formula. Here, the salt concentration of permeate was determined from the measured value of electric conductivity.

Salt rejection ratio (%)=100×{1−(sodium chloride concentration in permeate/sodium chloride concentration in feed water)}

In (5) and (6) above, in a case where the separation membrane is a hollow fiber membrane, the membrane filtration treatment was performed by manufacturing a small-sized module as follows.

The hollow fiber membranes were bundled, inserted into a plastic pipe, and thereafter, sealed by injecting a thermosetting resin into the pipe and curing it at the ends. Opening surfaces of the hollow fiber membranes were obtained by cutting the end portions of the sealed hollow fiber membranes to prepare the small-sized module for evaluation, having a membrane area on an outer diameter basis of about 0.1 m².

Here, in (5) and (6) above, the membrane filtration treatment was performed so that the layer (I) was in contact with the feed water side.

(7) Defect Resistance 20 separation membranes (in a case of the hollow fiber membrane, 20 small-sized modules described above) were prepared, the salt rejection ratio was determined by the method described in (6) above, among the 20 separation membranes (in the case of the hollow fiber membrane, 20 small-sized modules), a difference between the highest numerical value and the lowest numerical value was calculated as a defect parameter. Evaluation was performed using the defect parameter, according to the following standards.

⊙: less than 0.2
○: 0.2 or more to less than 1
Δ: 1 or more to less than 3
x: 3 or more (8) Tensile Strength (MPa)

A tensile strength (breaking strength) (MPa) was measured in an environment at a temperature of 20° C. and a humidity of 65%, using a tensile tester (Tensilon UCT-100, manufactured by Orientec Co., Ltd.) under conditions of a sample length of 100 mm and a tension rate of 100 mm/min. The measurement was repeated 5 times, and an average value thereof was taken as a tensile strength.

[Resin (A)]

(A1)

To 100 parts by weight of cellulose (cotton linter), 240 parts by weight of acetic acid and 67 parts by weight of propionic acid were added, and mixed at 50° C. for 30 minutes. After the mixture was cooled to room temperature, 172 parts by weight of acetic anhydride cooled in an ice bath and 168 parts by weight of propionic anhydride were added as esterifying agents, and 4 parts by weight of sulfuric acid was added as an esterifying catalyst, followed by stirring for 150 minutes to carry out an esterification reaction. When the temperature exceeded 40° C. in the esterification reaction, cooling was carried out in a water bath. After the reaction, a mixed solution of 100 parts by weight of acetic acid and 33 parts by weight of water was added thereto as a reaction terminator for 20 minutes to hydrolyze excessive anhydrides. Thereafter, 333 parts by weight of acetic acid and 100 parts by weight of water were added, the mixture was stirred at 80° C. for 1 hour. After the completion of the reaction, an aqueous solution containing 6 parts by weight of sodium carbonate was added, the precipitated cellulose acetate propionate was separated by filtration, subsequently washed with water, and thereafter dried at 60° C. for 4 hours. In the obtained cellulose acetate propionate, the average degrees of substitution of acetyl groups and propionyl groups were 1.9 and 0.7, respectively, and the weight average molecular weight (Mw) thereof was 178,000.

(A2)

Cellulose acetate (LT 35) manufactured by Daicel Corporation, degree of substitution: 2.90

[Plasticizer and Hydrophilic Resin (B)]

(B1)

Polyethylene glycol, having a weight average molecular weight of 600

(B2)

Polyethylene glycol, having a weight average molecular weight of 3400

(B3)

Polyethylene glycol, having a weight average molecular weight of 8300

(B4)

Glycerin

Production of Separation Membrane

Example 1

78 wt % of cellulose ester (A1), and 22 wt % of polyethylene glycol (B1) having a weight average molecular weight of 600 were melt-kneaded at 240° C. in a twin screw extruder, homogenized, and then pelletized to obtain a resin composition. The pellet was vacuum dried at 80° C. for 8 hours.

The dried pellet of the resin composition was fed to a twin-screw extruder and melt-kneaded at 230° C. Thereafter, an extrusion amount was adjusted by a gear pump and the pellet was spun out downward from a double tube spinneret (L=2 mm, and L/D=4) in which a gas channel was arranged in a central part thereof.

The spun-out hollow fiber membranes were introduced into a cooling apparatus (chimney) such that a distance from a lower surface of the spinneret to an upper end of the cooling apparatus was 30 mm, cooled with cooling air at 25° C. and an air speed of 1.5 m/sec, and bundled by applying an oil solution, and the spun-out yarn was then wound by a winder at a draft ratio of 50. Thereafter, the obtained yarn was immersed in a 10 wt % aqueous solution of isopropyl alcohol for 1 hour to elute the plasticizer to obtain a hollow fiber membrane. From a weight change before and after immersion, the polyethylene glycol (B1) having a weight average molecular weight of 600 added as a plasticizer upon melt spinning was completely eluted from the hollow fiber membrane into the water. The structure and physical properties of the obtained hollow fiber membrane were shown in Table 1.

Example 2

A hollow fiber membrane was obtained in the same manner as in Example 1 and with the same L and L/D as in Example 1, except that a spinneret with a different discharge port diameter was used and the draft ratio was set to 200. From a weight change before and after immersion, the polyethylene glycol (B1) having a weight average molecular weight of 600 added as a plasticizer upon melt spinning was completely eluted from the hollow fiber membrane into the water. The structure and physical properties of the obtained hollow fiber membrane were shown in Table 1.

Example 3

A hollow fiber membrane was obtained in the same manner as in Example 2, except that components of the resin composition were changed as shown in Table 1. From a weight change before and after immersion, the polyethylene glycol (B1) having a weight average molecular weight of 600 and the polyethylene glycol (B2) having a weight average molecular weight of 3400, which were added as a plasticizer and a hydrophilic resin, upon melt spinning were completely eluted from the hollow fiber membrane into the water. The structure and physical properties of the obtained hollow fiber membrane were shown in Table 1.

Examples 4 to 6

A hollow fiber membrane was obtained in the same manner as in Example 2, except that the L and L/D of the spinneret were changed as shown in Table 1. From a weight change before and after immersion, the polyethylene glycol (B1) having a weight average molecular weight of 600 added as a plasticizer upon melt spinning was completely eluted from the hollow fiber membrane into the water. The structure and physical properties of the obtained hollow fiber membrane were shown in Table 1.

Comparative Example 1

A hollow fiber membrane was obtained in the same manner as in Example 1, except that the L and L/D of the spinneret were changed as shown in Table 1. From a weight change before and after immersion, the polyethylene glycol (B1) having a weight average molecular weight of 600 added as a plasticizer upon melt spinning was completely eluted from the hollow fiber membrane into the water. The structure and physical properties of the obtained hollow fiber membrane were shown in Table 1.

Comparative Example 2

A hollow fiber membrane was obtained in the same manner as in Example 1 and with the same 1, and L/D as in Example 1, except that the components of the resin composition were changed as shown in Table 1, a spinneret with a different discharge port diameter was used and the draft ratio was set to 20. From a weight change before and after immersion, the polyethylene glycol (B1) having a weight average molecular weight of 600 and glycerin (B4), which were added as a plasticizer and a hydrophilic resin, upon melt spinning was completely eluted from the hollow fiber membrane into the water. The structure and physical properties of the obtained hollow fiber membrane were shown in Table 1.

Example 7

78 wt % of cellulose ester (A1), 18 wt % of polyethylene glycol (B1) having a weight average molecular weight of 600, and 4 wt % of polyethylene glycol (B2) having a weight average molecular weight of 3400 were melt-kneaded at 240° C. in a twin screw extruder, homogenized, and then pelletized to obtain a resin composition for the layer (I). The pellet was vacuum dried at 80° C. for 8 hours.

In addition, 68 wt % of cellulose ester (A1), 22 wt % of polyethylene glycol (B1) having a weight average molecular weight of 600, and 10 wt % of polyethylene glycol (B3) having a weight average molecular weight of 8300 were melt-kneaded at 240° C. in a twin screw extruder, homogenized, and then pelletized to obtain a resin composition for the layer (II). The pellet was vacuum dried at 80° C. for 8 hours.

The dried pellet of the resin composition for the layer (I) and the dried pellet of the resin composition for the layer (II) were each fed to separate twin-screw extruders, melt-kneaded at 220° C. Thereafter, an extrusion amount was adjusted by a gear pump such that the layer (I) side: the layer (II) side=1:5 is achieved. Then, the pellets were introduced into a spinning spinneret with a multi-tube nozzle having a gas channel arranged in the central part thereof, such that an outer layer becomes the layer (I) and an inner layer becomes the layer (III), and compounded within the spinneret. Thereafter, the compounded composition was spun downward from spinneret holes (L=2 mm, and L/D=4). The spun-out hollow fiber membranes were introduced into a cooling apparatus (chimney) such that a distance from a lower surface of the spinneret to an upper end of the cooling apparatus was 30 mm, cooled with cooling air at 25° C. and an air speed of 1.5 m/sec, and bundled by applying an oil solution, and the spun-out yarn was then wound by a winder at a draft ratio of 200. Thereafter, the obtained yarn was immersed in a 10 wt % aqueous solution of isopropyl alcohol for 1 hour to elute the plasticizer and the hydrophilic resin to obtain a composite hollow fiber membrane. From a weight change before and after immersion, the polyethylene glycol (B1) having a weight average molecular weight of 600, the polyethylene glycol (B2) having a weight average molecular weight of 3400, and polyethylene glycol (B3) having a weight average molecular weight of 8300, which were added as a plasticizer and a hydrophilic resin, upon melt spinning were completely eluted from the composite hollow fiber membrane into the water, respectively. The structure and physical properties of the obtained composite hollow fiber membrane were shown in Table 2.

Example 8

A composite hollow fiber membrane was obtained in the same manner as in Example 7, except that the L and L/D of the spinneret hole were changed as shown in Table 2. From a weight change before and after immersion, the polyethylene glycol (B1) having a weight average molecular weight of 600, the polyethylene glycol (B2) having a weight average molecular weight of 3400, and polyethylene glycol (B3) having a weight average molecular weight of 8300, which were added as a plasticizer and a hydrophilic resin, upon melt spinning were completely eluted from the composite hollow fiber membrane into the water, respectively. The structure and physical properties of the obtained composite hollow fiber membrane were shown in Table 2.

Example 9

A composite hollow fiber membrane was obtained in the same manner as in Example 8, except that the extrusion amount was adjusted such that the layer (I) side: the layer (II) side=1:10 is achieved when adjusting the extrusion amount with the gear pump. From a weight change before and after immersion, the polyethylene glycol (B1) having a weight average molecular weight of 600, the polyethylene glycol (B2) having a weight average molecular weight of 3400, and polyethylene glycol (B3) having a weight average molecular weight of 8300, which were added as a plasticizer and a hydrophilic resin, upon melt spinning were completely eluted from the composite hollow fiber membrane into the water, respectively. The structure and physical properties of the obtained composite hollow fiber membrane were shown in Table 2.

Comparative Example 3

A composite hollow fiber membrane was obtained in the same manner as in Example 7 and with the same L. and IUD as in Example 7, except that a spinneret with a different discharge port diameter was used and the draft ratio was set to 10. From a weight change before and after immersion, the polyethylene glycol (B1) having a weight average molecular weight of 600, the polyethylene glycol (B2) having a weight average molecular weight of 3400, and polyethylene glycol (B3) having a weight average molecular weight of 8300, which were added as a plasticizer and a hydrophilic resin, upon melt spinning were completely eluted from the composite hollow fiber membrane into the water, respectively. The structure and physical properties of the obtained hollow fiber membrane were shown in Table 2.

TABLE 1

|  |  |  |  |  | Example 1 | Example 2 | Example 3 | Example 4 | Example 5 | Example 6 | Comparative Example 1 | Comparative Example 2 |
|---|---|---|---|---|---|---|---|---|---|---|---|---|
| Resin composition for melt-spinning | Layer (I) | Component 1 | Type | | A1 | A1 | A1 | A1 | A1 | A1 | A1 | A2 |
| | | | wt % | | 78 | 78 | 78 | 78 | 78 | 78 | 78 | 78 |
| | | Component 2 | Type | | B1 | B1 | B1 | B1 | B1 | B1 | B1 | B1 |
| | | | wt % | | 22 | 22 | 18 | 22 | 22 | 22 | 22 | 18 |
| | | Component 3 | Type | | — | — | B2 | — | — | — | — | B4 |
| | | | wt % | | — | — | 4 | — | — | — | — | 4 |
| Production conditions | L | | mm | | 2 | 2 | 2 | 4 | 6 | 8 | 0.5 | 2 |
| | L/D | | — | | 4 | 4 | 4 | 8 | 12 | 16 | 1 | 4 |
| | Draft ratio | | — | | 50 | 200 | 200 | 200 | 200 | 200 | 50 | 20 |
| Structure and physical properties of membrane | Layer (I) | Thickness | μm | | 12 | 10 | 10 | 11 | 10 | 10 | 13 | 23 |
| | | Pa | nm | | 1.2 | 1.0 | 1.8 | 1.0 | 0.9 | 0.9 | 1.4 | 3.2 |
| | | Pb | nm | | 1.3 | 1.1 | 1.8 | 1.0 | 1.0 | 0.9 | 1.4 | 3.2 |
| | | Pc | nm | | 1.2 | 0.1 | 0.2 | 0.1 | 0.1 | 0.0 | 1.4 | 2.6 |
| | | Ha | % | | 27 | 32 | 31 | 31 | 32 | 31 | 27 | 24 |
| | | Hb | % | | 26 | 31 | 31 | 32 | 32 | 30 | 28 | 24 |
| | | Hc | % | | 11 | 2 | 3 | 1 | 1 | 0 | 21 | 15 |
| | Outer diameter | | μm | | 58 | 51 | 51 | 55 | 52 | 50 | 60 | 113 |
| | Precentage of hollowness | | % | | 34 | 37 | 37 | 36 | 38 | 35 | 33 | 35 |
| | Membrane permeation flux | | L/m²/day | | 2.7 | 2.5 | 3.8 | 2.4 | 2.3 | 2.0 | 3.2 | 10.1 |
| | Salt rejection ratio | | % | | 93.1 | 98.0 | 97.9 | 98.5 | 99.0 | 99.4 | 89.1 | 43.2 |
| | Defect resistance | | — | | Δ | ◯ | ◯ | ◯ | ◯ | ◯ | Δ | X |
| | Tensile strength | | MPa | | 74 | 154 | 136 | 150 | 147 | 140 | 68 | 36 |

TABLE 2

|  |  |  |  | Example 7 | Example 8 | Example 9 | Comparative Example 3 |
|---|---|---|---|---|---|---|---|
| Resin composition for melt-spinning | Layer (I) | Component 1 | Type | A1 | A1 | A1 | A1 |
| | | | wt % | 78 | 78 | 78 | 78 |
| | | Component 2 | Type | B1 | B1 | B1 | B1 |
| | | | wt % | 18 | 18 | 18 | 18 |
| | | Component 3 | Type | B2 | B2 | B2 | B2 |
| | | | wt % | 4 | 4 | 4 | 4 |
| | Layer (II) | Component 1 | Type | A1 | A1 | A1 | A1 |
| | | | wt % | 68 | 68 | 68 | 68 |
| | | Component 2 | Type | B1 | B1 | B1 | B1 |
| | | | wt % | 22 | 22 | 22 | 22 |
| | | Component 3 | Type | B3 | B3 | B3 | B3 |
| | | | wt % | 10 | 10 | 10 | 10 |
| Production conditions | L | | mm | 2 | 6 | 6 | 2 |
| | L/D | | — | 4 | 12 | 12 | 4 |
| | Draft ratio | | — | 200 | 200 | 200 | 10 |
| Structure and physical properties of membrane | Layer (I) | Thickness | μm | 1.5 | 1.5 | 0.7 | 3 |
| | | Pa | nm | 1.7 | 1.6 | 1.6 | 1.5 |
| | | Pb | nm | 1.7 | 1.7 | 1.6 | 1.7 |
| | | Pc | nm | 0.2 | 0.1 | 0.1 | 1.4 |

TABLE 2-continued

|  |  | Example 7 | Example 8 | Example 9 | Comparative Example 3 |
|---|---|---|---|---|---|
| Ha | % | 30 | 29 | 29 | 22 |
| Hb | % | 30 | 30 | 29 | 21 |
| Hc | % | 3 | 1 | 1 | 20 |
| Layer (II) Thickness | μm | 9 | 9 | 10 | 18 |
| Outer diameter | μm | 55 | 55 | 56 | 103 |
| Percentage of hollowness | % | 38 | 38 | 37 | 35 |
| Membrane permeation flux | L/m²/day | 16.5 | 15.3 | 32.0 | 7.5 |
| Salt rejection ratio | % | 97.7 | 98.5 | 98.3 | 88.5 |
| Defect resistance | — | ◎ | ◎ | ◎ | X |
| Tensile strength | MPa | 125 | 122 | 120 | 51 |

From the results of Tables 1 and 2, it is seen that the separation membranes of Examples 1 to 9, in which the average pore diameter Pa of the region a and the average pore diameter Pb of the region b are 0.3 nm to 3.0 nm, and the average pore diameter Pc of the region c is 3.0 nm or less, the open pore ratio Ha of the region a, the open pore ratio Hb of the region b, and the open pore ratio Hc of the region c satisfy formulas of 2Hc<Ha and 2Hc<Hb, have a certain membrane permeation flux (permeation performance) and salt rejection ratio (separation performance), and are also excellent in defect resistance.

In contrast, the separation membranes of Comparative Examples 1 to 3 in which the open pore ratio Ha of the region a, the open pore ratio Hb of the region b, and the open pore ratio Hc of the region c do not satisfy the formulas of 2Hc<Ha and 2Hc<Hb, and the separation membrane of Comparative Example 2 in which the average pore diameter Pa of the region a and the average pore diameter Pb of the region b are not in the range of 0.3 nm to 3.0 nm are poor in salt rejection ratio (separation performance) and defect resistance.

Although the present invention has been described in detail using specific embodiments, it will be apparent to those skilled in the art that various modifications and variations are possible without departing from the spirit and scope of the present invention. This application is based on Japanese Patent Application (Patent Application No. 2016-016423) filed on Jan. 29, 2016, the entirety of which is incorporated by reference.

INDUSTRIAL APPLICABILITY

The present invention provides a separation membrane being excellent in permeation performance and separation performance, and having fewer occurrences of defects. The separation membrane of the present invention can be used for water treatment membranes for producing industrial water, drinking water or the like from seawater, brackish water, sewage water, waste water or the like, medical membranes for artificial kidneys, plasma separation or the like, membranes for food-beverage industry such as fruit juice concentration, gas separation membranes for separating exhaust gas, carbonic acid gas, or the like, membranes for electronic industry such as fuel cell separators, or the like. The above-mentioned water treatment membrane can be preferably used for microfiltration membranes, ultrafiltration membranes, nanofiltration membranes, reverse osmosis membranes, forward osmosis membranes, or the like.

DESCRIPTION OF REFERENCE NUMERALS

1 Layer (I)
2 Surface A
3 Surface B
4 Distance (50 nm) from surface A to upper surface of region a
5 Distance (150 nm) from surface A to lower surface of region a
6 Distance (50 nm) from surface B to lower surface of region b
7 Distance (150 nm) from surface B to upper surface of region b
8 Distance from surface A to upper surface of region c
9 Distance from surface B to lower surface of region c
10 Thickness (100 nm) of region c
11 Region a
12 Region b
13 Region c
14 Channel of resin composition
15 Gas channel
16 hole length (L)
17 Hole opening (D)

The invention claimed is:

1. A separation membrane, comprising: a layer (I) having a thickness of 0.5 μm to 100 μm, wherein,
when, in a cross section of the layer (I) in a thickness direction, a region at a depth of 50 nm to 150 nm from a surface (surface A) is defined as a region a, a region at a depth of 50 nm to 150 nm from the other surface (surface B) is defined as a region b, and a region having a thickness of 100 nm which is at the same depth from both of the surfaces is defined as a region c, both of an average pore diameter Pa of the region a and an average pore diameter Pb of the region b are 0.3 nm to 3.0 nm, and an average pore diameter Pc of the region c is 3.0 nm or less, and
an open pore ratio Ha of the region a, an open pore ratio Hb of the region b, and an open pore ratio Hc of the region c satisfy the following formulas:

$$2Hc < Ha; \text{ and}$$

$$2Hc < Hb.$$

2. The separation membrane according to claim 1, wherein both of the open pore ratio Ha and the open pore ratio Hb are 2% to 80%, and the open pore ratio Hc is 40% or less.

3. The separation membrane according to claim 1, wherein the layer (I) contains at least one selected from the group consisting of polyamide, polyester, and cellulose ester.

4. The separation membrane according to claim 1, comprising a structure in which a layer (II) including a porous support membrane having a thickness of 5 μm to 500 μm is further laminated.

5. The separation membrane according to claim 1, wherein the separation membrane has a form of a hollow fiber.

6. The separation membrane according to claim 1, wherein a tensile strength in a longitudinal direction thereof is 70 MPa or more.

7. The separation membrane according to claim 1, wherein when an aqueous solution of sodium chloride, adjusted to a concentration of 500 ppm and a pH of 6.5, is filtrated at 25° C. and a pressure of 0.75 MPa, a water permeation amount is 2 L/m²/day or more.

* * * * *